United States Patent
Billingham et al.

[11] Patent Number: 5,921,109
[45] Date of Patent: Jul. 13, 1999

[54] METHOD FOR OPERATING A CRYOGENIC RECTIFICATION COLUMN

[75] Inventors: John Frederic Billingham, Getzville; Daniel Mark Seiler, Lockport; Michael James Lockett, Grand Island, all of N.Y.

[73] Assignee: Praxair Technology, Inc., Danbury, Conn.

[21] Appl. No.: 09/176,277

[22] Filed: Oct. 21, 1998

[51] Int. Cl.⁶ ........................................ F25J 1/00
[52] U.S. Cl. .............................. 62/643; 62/906
[58] Field of Search .............. 62/643, 906, 924

[56] References Cited

U.S. PATENT DOCUMENTS

| | | | |
|---|---|---|---|
| 4,836,836 | 6/1989 | Bennett et al. | 62/906 |
| 4,838,913 | 6/1989 | Victor et al. | 62/22 |
| 4,871,382 | 10/1989 | Thorogood et al. | 62/924 |
| 5,019,144 | 5/1991 | Victor et al. | 62/22 |
| 5,100,448 | 3/1992 | Lockett et al. | 62/24 |
| 5,237,823 | 8/1993 | Cheung et al. | 62/906 |
| 5,419,136 | 5/1995 | McKeigue | 62/24 |
| 5,548,975 | 8/1996 | Rieth et al. | 62/646 |
| 5,632,934 | 5/1997 | Billingham et al. | 261/112.2 |
| 5,644,932 | 7/1997 | Dynbobbin et al. | 62/640 |
| 5,653,126 | 8/1997 | Harada et al. | 62/643 |

OTHER PUBLICATIONS

Hanley et al., "Unified Model Four Countercurrent Vapor/Liquid Packed Columns" Ind. Eng. Chem. Res. 1994, 33, 1208–1221.

*Primary Examiner*—Ronald Capossela
*Attorney, Agent, or Firm*—Stanley Ktorides

[57] ABSTRACT

A method for operating a cryogenic rectification column for the separation of the components of air by cryogenic rectification, whereby the column may be operated above its design capacity without encountering flooding, by passing vapor upward through the column at a flowrate which generates a pressure drop within the column of at least 0.7 inches of water per foot of packing height through a height of defined structured packing sheets having a different structure in their upper and lower portions.

7 Claims, 6 Drawing Sheets

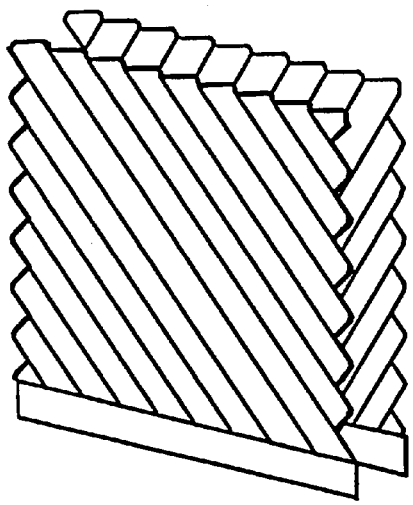 
Fig. 2A    Fig. 2B
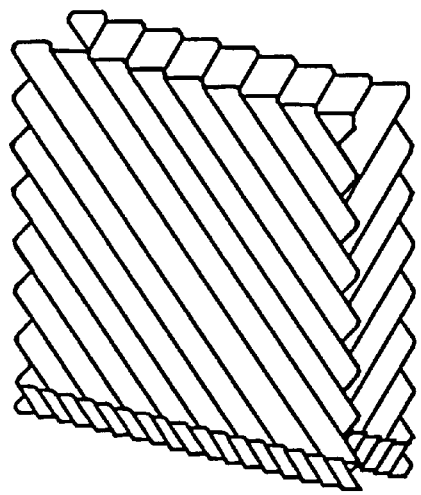 
Fig. 3A    Fig. 3B

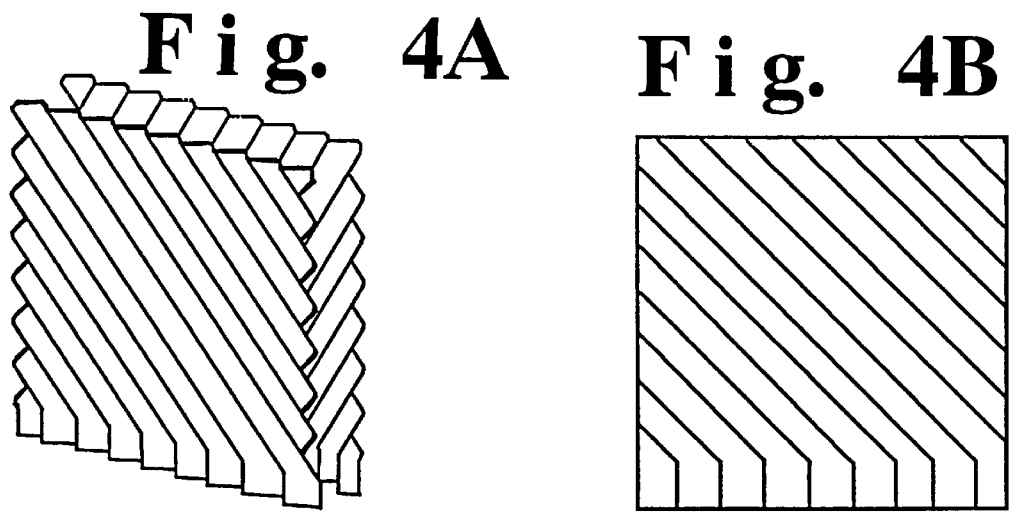
Fig. 4A  Fig. 4B
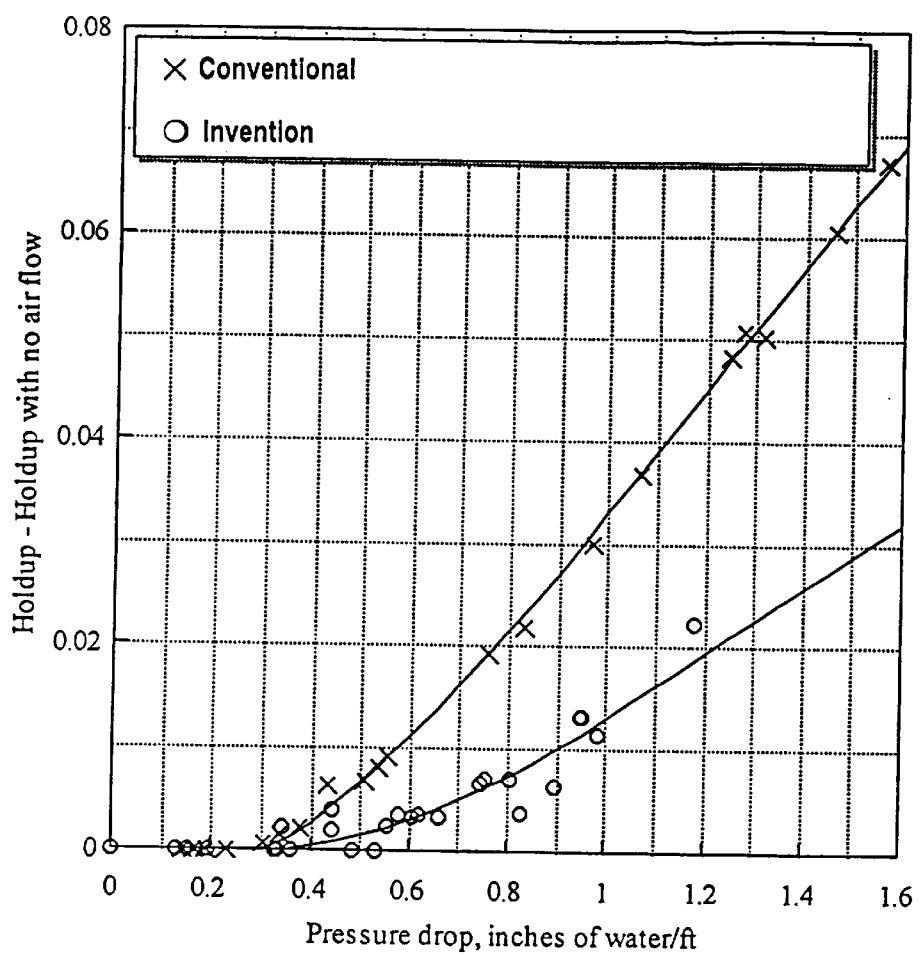
Fig. 9

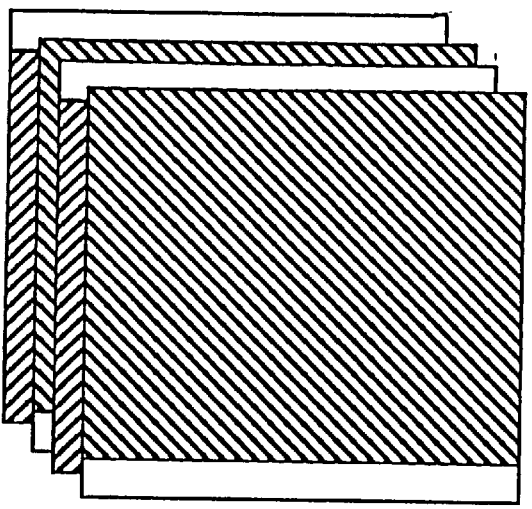 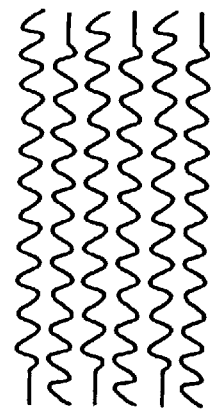
Fig. 5A  Fig. 5B
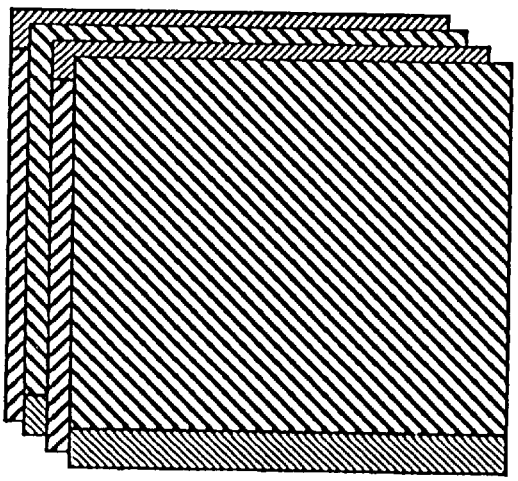 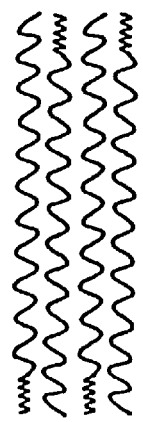
Fig. 6A  Fig. 6B

METHOD FOR OPERATING A CRYOGENIC RECTIFICATION COLUMN

TECHNICAL FIELD

This invention relates generally to cryogenic rectification of air for the separation of air into its components and is particularly useful for operating a cryogenic rectification column at increased capacity for carrying out the rectification.

BACKGROUND ART

It is desirable to operate an air separation plant beyond the design capacity of the plant in order to produce extra products from the plant if such increased capacity operation can be carried out economically.

Most components of an air separation plant can be designed or modified to accept an increased flowrate. For example, an upstream blower can be used to boost the capacity of a compressor. Heat exchangers can be operated at increased flowrates simply by accepting an increased pressure drop. The capacity of air prepurifiers can also be increased by operating at increased pressure drop provided that fluidization of the adsorbent particles is avoided. However, it is more difficult to increase the capacity of the distillation columns in an air separation plant because they are capacity limited by the phenomenon of flooding. Flooding occurs in process equipment whenever there is vertical countercurrent two-phase flow and the flowrates are such that they exceed the capacity of the equipment. In both packed and trayed columns, the approach to flooding is characterized by a rapidly increasing pressure drop, by a loss of separation performance and by unstable operation. The onset of flooding in the columns is usually the limiting bottleneck encountered when attempting to increase the capacity of an air separation plant beyond its design capacity.

In general it is well established that distillation column capacity can be increased by changing the column pressure. Raising the pressure increases the vapor density, allowing an increase in the mass flowrate of vapor. However, increasing the pressure lowers the relative volatility thus making the distillation separation more difficult. The vapor mass flowrate capacity increases as the 0.4 or 0.5 power of the operating pressure for packed and trayed columns respectively.

The disadvantage of this solution to the flooding problem is that an increase in the column operating pressure translates into a substantial increase in the discharge pressure of the main air compressor, and in increased power costs. A pressure increase is particularly disadvantageous in the upper (or lower pressure) column of a double column plant since any increase in pressure must typically be multiplied by three as it is propagated across the main condenser/reboiler, because of the differences in the vapor pressure/temperature relationships of oxygen and nitrogen.

A solution to the problem is to increase the flowrates through the columns beyond the design point but not as far as the flood point. Typically packed columns are designed at about 80 percent of the flood point. Unfortunately, using conventional structured packing, flowrates can be increased only slightly beyond the design point because pressure drop fluctuations become so large that the columns become unstable.

Accordingly it is an object of this invention to provide a method for operating a cryogenic rectification column to carry out the separation of the components of air at increased capacity while avoiding flooding.

SUMMARY OF THE INVENTION

The above and other objects which will become apparent to one skilled in the art upon a reading of this disclosure, are attained by the present invention, which is:

A method for operating a cryogenic rectification column comprising:

(A) passing a mixture comprising a more volatile component of air and a less volatile component of air into a column, said column containing a height of packing comprising packing sheets which have a lower portion which differs in structure from an upper portion of the sheet;

(B) carrying out cryogenic rectification within the column wherein vapor flows upward through the height of packing sheets and liquid flows downward through the height of packing sheets whereby the said more volatile component concentrates in the upflowing vapor and the said less volatile component concentrates in the downflowing liquid;

(C) passing the upflowing vapor upward through the height of packing within the column at a flowrate so as to have a pressure drop within the column of at least 0.7 inches of water per foot of packing height; and (D) withdrawing more volatile component from the upper portion of the column and withdrawing less volatile component from the lower portion of the column.

The term "column" as used herein means a distillation or fractionation column or zone, i.e., a contacting column or zone wherein liquid and vapor phases are countercurrently contacted to effect separation of a fluid mixture, as, for example, by contacting of the vapor and liquid phases on packing elements. For a further discussion of distillation columns see the Chemical Engineers' Handbook, Fifth Edition, edited by R. H. Perry and C. H. Chilton, McGraw-Hill Book Company, New York, Section 13, "Distillation" B. D. Smith, et al., page 13-3 *The Continuous Distillation Process.* Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the more volatile component(s) in the vapor phase and thereby the less volatile component(s) in the liquid phase. Partial condensation is the separation process whereby cooling of a vapor mixture can be used to concentrate the more volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases can be adiabatic or nonadiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is rectification carried out, at least in part, at temperatures below 150° K.

As used herein, the term "packing" means any solid or hollow body of predetermined configuration, size and shape used as column internals to provide surface area for the liquid to allow mass transfer at the liquid-vapor interface during countercurrent flow of the two phases.

As used herein, the term "structured packing" means diagonally cross-corrugated packing wherein individual members have specific orientation relative to each other and to the column axis.

As used herein, the terms "upper portion" and "lower portion" of a column or packing sheet mean those sections of the column or packing sheet respectively above and below the mid point of the column or packing sheet.

BRIEF DESCRIPTION OF THE DRAWINGS

FIGS. 2A and 2B illustrate in perspective and side views respectively one embodiment of structured packing sheets useful in the practice of the invention wherein the crimp height of the packing sheets in the lower portion is reduced to zero.

FIGS. 3A and 3B illustrate in perspective and side views respectively another embodiment of structured packing sheets useful in the practice of the invention wherein the crimp height of the packing sheets in the lower portion is reduced but not to zero.

FIGS. 4A and 4B illustrate in perspective and side views respectively another embodiment of structured packing sheets useful in the practice of the invention wherein the crimp height of the packing sheets in the lower portion is the same as in the upper portion but the corrugations in the lower portion are at a steeper angle than in the upper portion.

FIGS. 5A and 5B illustrate in perspective and side views respectively another embodiment of the structured packing sheets and their arrangement useful in the practice of the invention.

FIGS. 6A and 6B illustrate in perspective and side views respectively another embodiment of the structured packing sheets and their arrangement useful in the practice of the invention.

FIGS. 7, 8 and 9 are graphical representations of the advantages attainable with the practice of the invention.

DETAILED DESCRIPTION

It is known that the hydraulic capacity of cross-corrugated structured packing may be increased by making the resistance to gas or vapor flow between the packing sheets in the lower portion of the sheets less than the resistance to gas flow between the sheets in the upper portion of the sheets. The invention comprises the discovery that when structured packing sheets having a lower portion which differs in structure from an upper portion of the sheets are employed in a column and that column is operated with a pressure drop in excess of 0.7 inches of water per foot of packing height, such a column may be operated above the design point of the column while having improved mass transfer performance and column stability while avoiding flooding.

Figure 1:
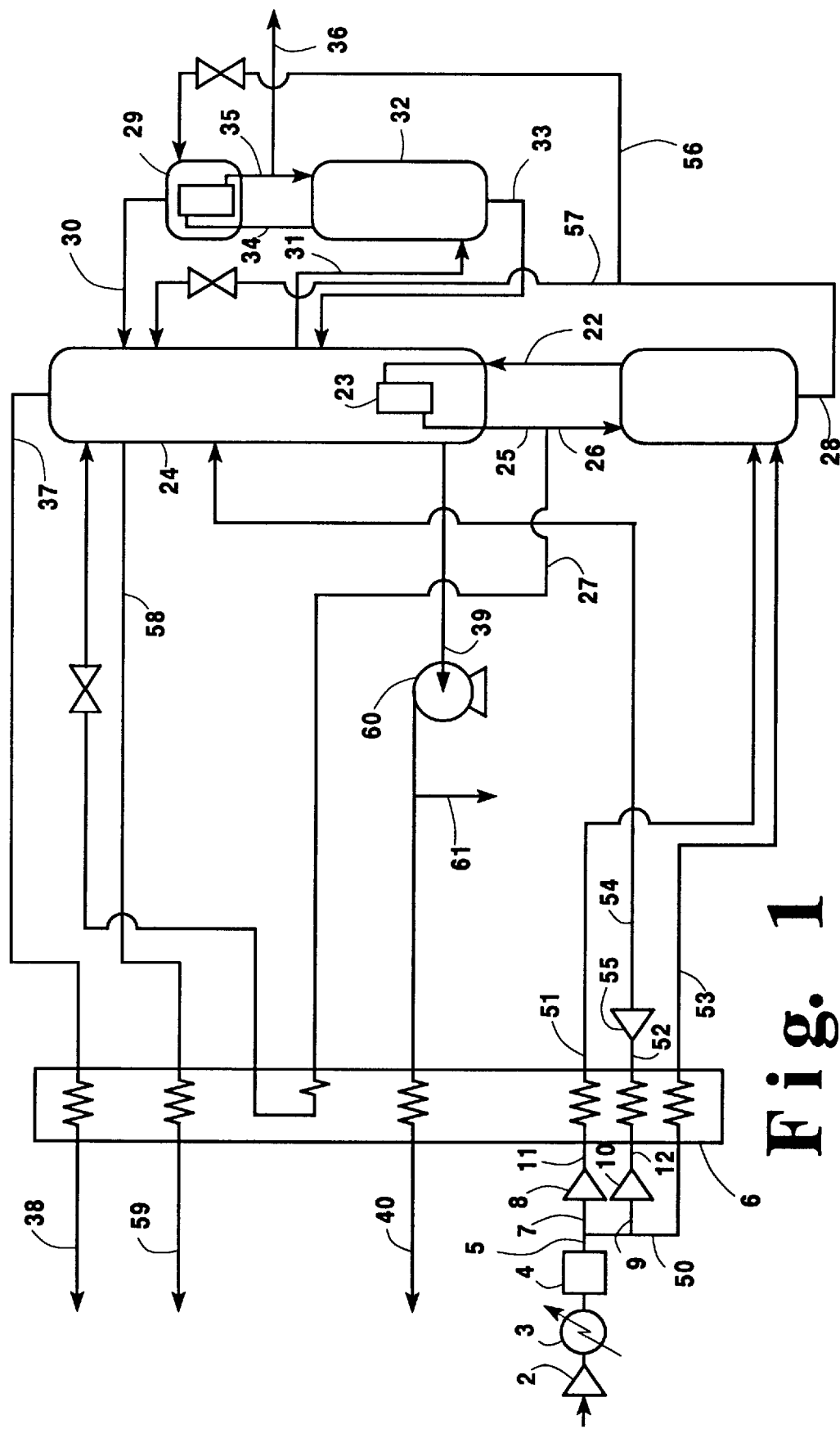
FIG. 1 is a schematic representation of one cryogenic rectification system which may be used in the practice of this invention.

The invention will be described in detail with reference to the Drawings. FIG. 1 illustrates one embodiment of a cryogenic rectification system wherein the invention may be practiced. The particular system illustrated in FIG. 1 comprises a double column and an argon sidearm column.

Referring now to FIG. 1, feed air 1 comprising primarily nitrogen, oxygen and argon is compressed in compressor 2 and cooled of the heat of compression by passage through cooler 3. The pressurized feed air is then cleaned of high boiling impurities such as water vapor, carbon dioxide and hydrocarbons by passage through purifier 4 which is typically a temperature or a pressure swing adsorption purifier. Cleaned, compressed feed air 5 is then cooled by indirect heat exchange with return streams in primary heat exchanger 6. In the embodiment illustrated in FIG. 1, a first portion 7 of feed air 5 is further compressed by passage through booster compressor 8, a second portion 9 is further compressed by passage through booster compressor 10, and resulting further compressed feed air portions 11 and 12 and remaining compressed feed air portion 50 are cooled by passage through primary heat exchanger 6 to produce compressed, cleaned and cooled feed air, in streams 51, 52, and 53 respectively. Stream 52 is turboexpanded to form stream 54 by passage through turboexpander 55 to generate refrigeration for the subsequent cryogenic rectification and then passed into lower pressure column 24. Streams 51 and 53 are each passed into higher pressure column 21.

Within higher pressure column 21 the feed air is separated by cryogenic rectification into nitrogen-enriched vapor and oxygen-enriched liquid. Nitrogen-enriched vapor is passed in stream 22 into main condenser 23 wherein it is condensed by indirect heat exchange with lower pressure column 24 bottom liquid to form nitrogen-enriched liquid 25. A portion 26 of nitrogen-enriched liquid 25 is returned to higher pressure column 21 as reflux, and another portion 27 of nitrogen-enriched liquid 25 is subcooled in heat exchanger 6 and then passed into lower pressure column 24 as reflux. Oxygen-enriched liquid is passed from the lower portion of higher pressure column 21 in stream 28 and a portion 56 is passed into argon column top condenser 29 wherein it is vaporized by indirect heat exchange with argon-richer vapor, and the resulting oxygen-enriched fluid is passed as illustrated by stream 30 from top condenser 29 into lower pressure column 24. Another portion 57 of the oxygen-enriched liquid is passed directly into lower pressure column 24.

A stream 31 comprising oxygen and argon is passed from lower pressure column 24 into argon column 32 wherein it is separated by cryogenic rectification into argon-richer vapor and oxygen-richer liquid. The oxygen-richer liquid is returned to lower pressure column 24 in stream 33. The argon-richer vapor is passed in stream 34 into top condenser 29 wherein it condenses by indirect heat exchange with the vaporizing oxygen-enriched liquid as was previously described. Resulting argon-richer liquid is returned in stream 35 to argon column 32 as reflux. Argon-richer fluid, as vapor and/or liquid is recovered from the upper portion of argon column 32 as product argon in stream 36.

Lower pressure column 24 is operating at a pressure less than that of higher pressure column 21. Within lower pressure column 24 the various feeds into the column are separated by cryogenic rectification into nitrogen-rich fluid and oxygen-rich fluid. Nitrogen-rich fluid is withdrawn from the upper portion of lower pressure column 24 as vapor stream 37, warmed by passage through primary heat exchanger 6 and recovered as product nitrogen 38. A waste stream S8 is withdrawn from the upper portion of lower pressure column 24, warmed by passage through heat exchanger 6 and removed from the system in stream 59. Oxygen-rich fluid is withdrawn from the lower portion of lower pressure column 24 as vapor and/or liquid. If withdrawn as a liquid, the oxygen-rich liquid may be pumped to a higher pressure and vaporized either in a separate product boiler or in primary heat exchanger 6 prior to recovery as high pressure product oxygen. In the embodiment illustrated in FIG. 1 oxygen-rich fluid is withdrawn from lower pressure column 24 as liquid stream 39, pumped to a higher pressure through liquid pump 60 vaporized by passage through primary heat exchanger 6 and recovered a product oxygen 40. A portion 61 of the liquid oxygen may be recovered as liquid.

At least one of the columns contains a plurality of vertically stacked structured packing layers or bricks. Each layer or brick comprises vertically oriented structured packing sheets with corrugations at an angle to the vertical axis. Sheets are arranged such that the corrugation direction of adjacent sheets is reversed. The layers are generally between 6 and 12 inches in height. Adjacent layers are rotated around a vertical axis to enhance mixing. The complete packed bed of a column comprises multiple layers of the packing, the number of layers being set by the height of packing required to perform the separation. The packing corrugations are characterized by a crimp height. The corrugation pattern may be sharp (saw-tooth) or rounded (sinusoidal). The sheets touch each other at contact points along the peaks and valleys of the corrugations.

One or more of the columns contains a height of packing, through at least some, preferably all, of the column height, wherein the packing sheets have a lower portion which differs in structure from an upper portion of the sheets. FIGS. 2, 3 and 4 illustrate three examples of such packing wherein the modification is in the lower portion of the packing sheets. Alternatively, the modification could occur in the upper portion of the packing sheets with the lower portion being unmodified. In a particularly preferred embodiment of the invention, the packing sheets alternate with one sheet having a modified lower portion and the adjacent sheet having a modified upper portion. Such packing is shown in FIGS. 5 and 6.

The packing sheets are vertically oriented in the column adjacent to each other across the diameter of the column to form a brick or layer of packing sheets, and another such brick or layer of packing sheets is placed atop the first layer and so on up the column to fill the column with packing.

Figure 7:
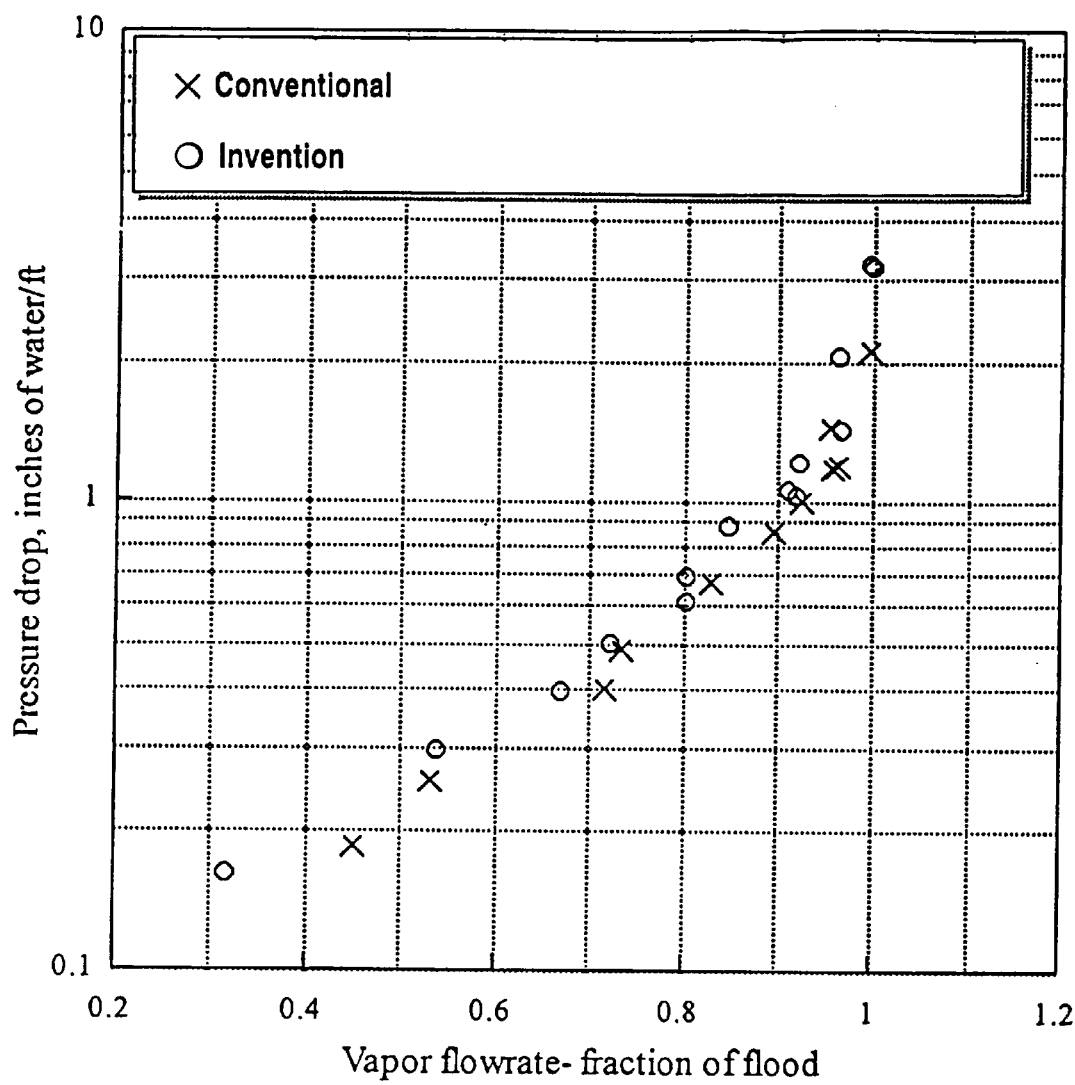
Figure 8:
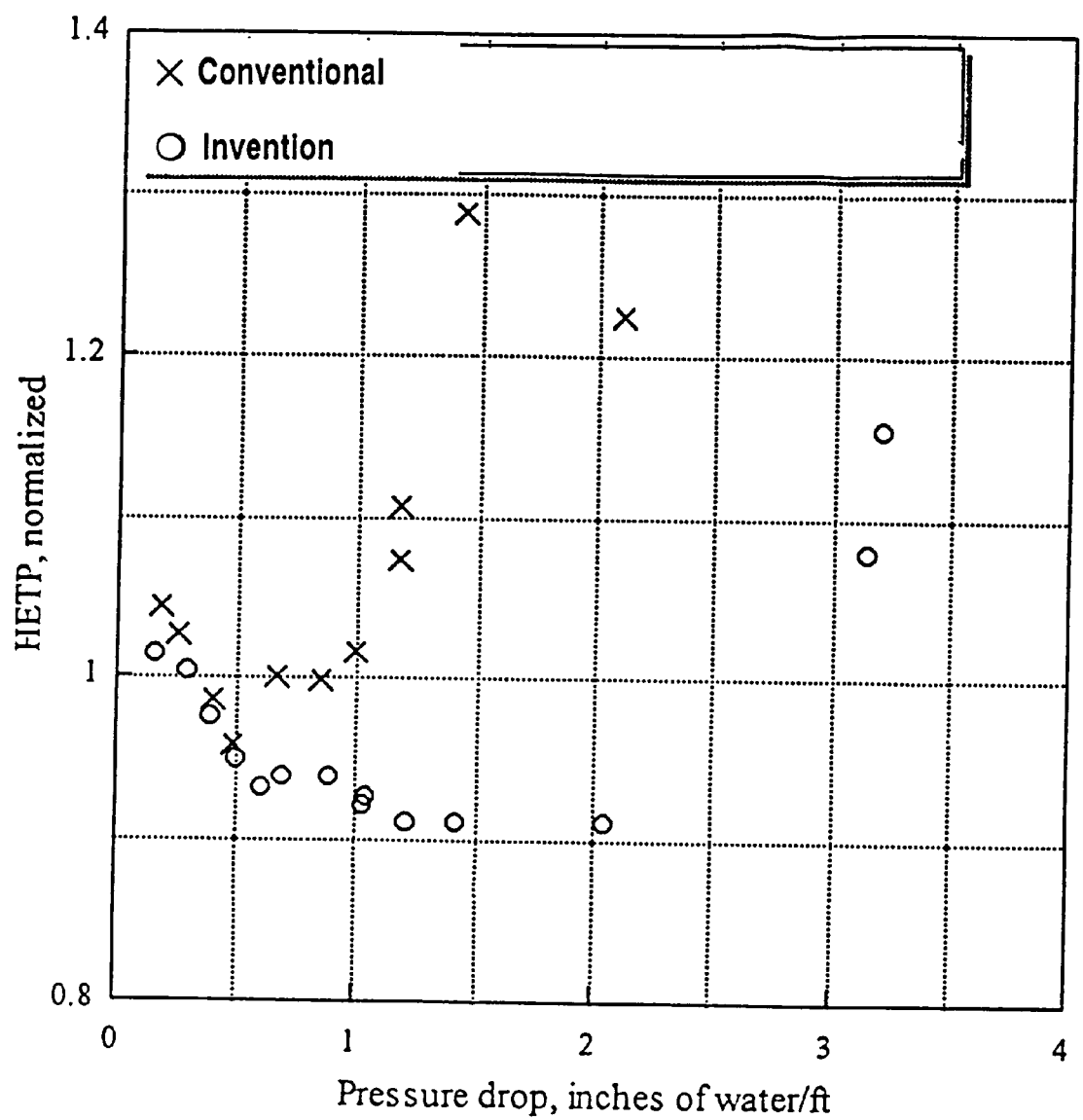

FIGS. 7, 8 and 9 report the results of tests carried out with the practice of the invention, wherein the data points are represented by circles, and, for comparative purposes, with conventional practice, wherein the data points are represented by crosses, so as to demonstrate the advantages of the invention. The distillation tests were carried out in a column of 12 inches diameter. The height of each packing layer was approximately 10 inches and ten layers of packing were used. The distillation mixture was comprised of oxygen and argon and the distillation operated at total reflux and at a pressure of 22 psia. Two sets of packings were tested. The first was a conventional structured packing which did not have any modification. The second, depicted in FIGS. 2A and 2B, was an identical packing except for a flattened region having a crimp height of zero in the lower portion of each of the sheets. This flattened region had a height 0.375 inches. Both packings had a specific surface area of approximately 700 $m^2/m^3$ and had identical crimp size, material of construction, surface texture and perforations.

FIG. 7 shows the pressure drop plotted against the vapor flow rate expressed as a fraction of the vapor flow rate at the flood point. Results for both conventional structured packing and structured packing having a modification in the lower portion are shown on FIG. 7. The pressure drop of both types of packing follows the same relationship when plotted against the fraction of flooding. A typical design point, with a typical control scheme, would be 80 percent of flood for both types of packing, which corresponds to a pressure drop of 0.6 to 0.7 inches of water per foot.

However, we have discovered remarkable differences in behavior between the two types of packing when they are operated at a pressure drop in excess of 0.7 inches of water per foot. These differences are in a) mass transfer performance and b) column stability. As a result of these differences, it is difficult to operate packed cryogenic separation columns beyond the typical design point when conventional structured packing is utilized, whereas such columns are easily operated above the design point when structured packing having a different structure in the lower portion from that of the upper portion is employed.

FIG. 8 shows the normalized HETP plotted against the column pressure drop for both conventional structured packing and for the aforesaid structured packing. The HETP (height equivalent to a theoretical plate) is normalized by dividing each measured HETP value by the HETP of conventional structured packing at the design point pressure drop of 0.7 inches of water per foot of packing height. There is a very distinct difference between the two packings. The HETP of conventional structured packing increased as the pressure drop increased above 0.5 inches of water per foot and increased very rapidly above 1.0 inches of water per foot. In contrast, for the defined packing of the invention, the HETP continued to fall even up to a column pressure drop of 2 inches of water per foot of packing height and remained below the design point value of the conventional packing even up to 2.6 inches of water per foot of packing height. It should be noted that the deterioration of the mass transfer performance of conventional structured packing at pressure gradients above 0.5 inches of water per foot of packing height has been frequently previously reported.

In the course of the experiments described above, it was noticed that conventional packing exhibited unstable behavior when operated at a pressure drop above the normal design point pressure drop of 0.7 inches of water per foot, in that any fluctuations in the vapor flowrate and in the column pressure drop resulted in a tendency for the column to flood. It was difficult to operate the column and extreme care was required to avoid flooding. In contrast, with the invention, stability was experienced with operation at a pressure drop above 0.7 inches of water per foot of packing height. Small fluctuations in vapor flowrate had no effect on the operability of the column. It was possible to operate the column up to a pressure drop of 3 inches of water per foot of packing height whereas with conventional packing it was not possible to exceed 2 inches of water per foot of packing height even with extremely careful operation.

In order to gain more insight about the different behavior of the two types of packing, a new series of experiments was carried out to measure the change of liquid hold-up (or liquid void fraction) with variations in the gas velocity. The column diameter was 4 ft and the packed height was 104 inches. Air was blown up through the packing by a blower and a liquid, Isopar-M, was caused to flow down through the packing. A carefully calibrated liquid distributor having 18 pour points per square foot was used to ensure uniform liquid distribution onto the packing. The change in hold-up of liquid on the packing was measured from the change in the liquid level in the sump below the packing after the air flow was changed. For example, an increase in the air flowrate caused the liquid level in the sump to fall because of increased liquid hold-up in the packing. Isopar-M has a surface tension of approximately 26 dynes/cm and is a more representative liquid than water to simulate the behavior of a cryogenic liquid which has a surface tension of 6–16 dynes/cm in the lower pressure and argon columns.

The results are shown in FIG. 9. For these experiments the liquid flowrate varied between 2 and 7 gallons per minute per square foot of column cross section. The ordinate is the difference between the liquid hold-up with air flow and the liquid hold-up with no air flow at the same liquid rate. The abscissa is the pressure drop over the packed bed which varied as the air and liquid flowrates were changed. Two sets of results are shown-a conventional structured packing and a packing which was identical except for a modification at the base of each brick as shown in FIGS. 2A and 2B. The specific surface area of each packing was approximately 700 $m^2/m^3$. There was a marked difference between the results for the two types of packing at pressure drops above 0.3 inches of water per foot of packing height. For the conventional structured packing, at a given pressure-drop there was a large liquid hold-up due to the air flow up through the packing. In contrast, for the packing with the reduced resistance to gas flow at the base of each brick, the liquid hold-up caused by the air flow was comparatively small. The slope of the two curves is also significant. For the conventional packing a small change in air flow, and hence in the pressure drop, caused a large change in the liquid hold-up. For the invention the same change in air flow and pressure drop caused a much smaller change in liquid hold-up. These results are consistent with the differences in stability noted for these two packings in the cryogenic distillation tests noted above.

One can speculate why a packing having only a small change in liquid hold-up as the vapor flowrate changes results in a more stable and easily controlled column than a packing for which there is a much bigger change in liquid hold-up. While not wishing to be held to any theory, it is believed that because the vapor hold-up is small, a small increase or decrease in the vapor flowrate is quickly transmitted through the column so that all equilibrium stages in the column are subject to the new vapor flowrate. Air separation is characterized by the low relative volatility such as of the oxygen-argon system and by operation close to the minimum reflux ratio. In order to avoid concentration pinches and reduced separation, it is necessary to always maintain the ratio of L and V, the Liquid to Vapor molar flowrates, at the design value. The perturbation in vapor flowrate must be matched by an equivalent change in the liquid flowrate to maintain the required L/V ratio on each stage. However, when the liquid hold-up changes significantly as the vapor rate changes, there is a delay in establishing the new liquid flowrates at each stage because liquid flowing down the column must be partly used to increase or decrease the liquid hold-up on each stage. Thus L/V is changed from the design value with a consequent deterioration in separation performance. We have found that the change of liquid hold-up with a change of vapor flowrate is considerably larger for conventional structured packing than it is for packing with a reduced resistance to vapor flow at the base of each brick. It is for this reason that a column containing packing of the latter type is more stable and easily controllable.

It is possible that the base of each brick in structured packing behaves analogously to a dual-flow distillation tray. In the latter both vapor and liquid pass countercurrently through the same openings in the tray deck. It is well known that dual-flow distillation trays suffer from liquid and vapor maldistribution at high vapor rates and that distillation tray efficiency is reduced as a consequence. The base of the bricks in conventional structured packing may behave analogously. Structured packing having modifications at the base of each brick appears to eliminate excess liquid hold-up in that region such that liquid and vapor can flow unimpeded in countercurrent flow without instability problems.

The vapor flowrate (as well as the liquid flowrate) varies in the distillation columns of an air separation plant from section to section and even throughout a given section. Consequently the pressure drop over the column as a whole or over a given section of packing may be less than 0.7 inches of water per foot of packing height even though for the most highly loaded brick or bricks it may exceed that value. It is the local pressure gradient, not the overall pressure gradient, which determines column stability and which is important in this invention.

Now with the practice of this invention, one can operate a cryogenic rectification column to separate the components of air at higher than the design point of the column while avoiding flooding. Although the invention has been described in detail with reference to certain preferred embodiments those skilled in the art will recognize that there are other embodiments of the invention within the spirit and the scope of the claims.

We claim:

1. A method for operating a cryogenic rectification column comprising:

(A) passing a mixture comprising a more volatile component of air and a less volatile component of air into a column, said column containing a height of packing comprising packing sheets which have a lower portion which differs in structure from an upper portion of the sheet;

(B) carrying out cryogenic rectification within the column wherein vapor flows upward through the height of packing sheets and liquid flows downward through the height of packing sheets whereby the said more volatile component concentrates in the upflowing vapor and the said less volatile component concentrates in the downflowing liquid;

(C) passing the upflowing vapor upward through the height of packing within the column at a flowrate so as to have a pressure drop within the column of at least 0.7 inches of water per foot of packing height; and (D) withdrawing more volatile component from the upper portion of the column and withdrawing less volatile component from the lower portion of the column.

2. The method of claim 1 wherein the more volatile component is nitrogen and the less volatile component is oxygen.

3. The method of claim 1 wherein the more volatile component is argon and the less volatile component is oxygen.

4. The method of claim 1 wherein the said difference in structure comprises a reduced crimp height in a lower portion of each packing sheet relative to the crimp height in an upper portion of each packing sheet.

5. The method of claim 4 wherein the crimp height in the lower portion of each packing sheet is zero.

6. The method of claim 1 wherein the said difference in structure comprises corrugations in a lower portion of each packing sheet that are at a steeper angle relative to corrugations in an upper portion of each packing sheet.

7. The method of claim 1 wherein adjacent sheets have modifications in the lower portion and in the upper portion respectively in alternating sequence.

* * * * *